Patented May 13, 1952

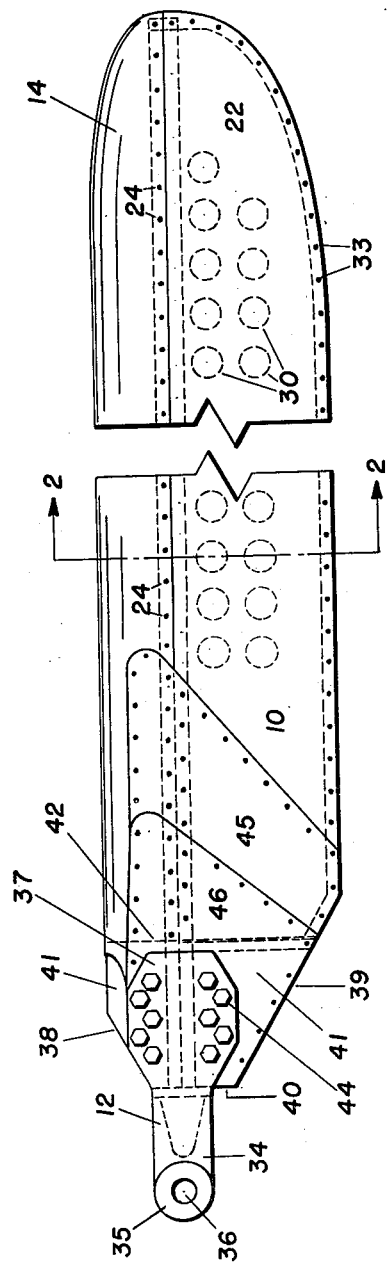

2,596,818

UNITED STATES PATENT OFFICE 2,596,818

ROTOR BLADE

Donald N. Meyers, Philadelphia, Pa., assignor, by mesne assignments, to Piasecki Helicopter Corporation, Morton, Pa., a corporation of Pennsylvania Application May 8, 1947, Serial No. 746,742

2 Claims. (Cl. 170—159)

This invention relates to blades and methods of making blades for rotors for aircraft.

More particularly the invention relates to a blade having a metal skin or covering, a portion of which forms a rigid self-supporting nose section and the remainder of which acts principally as a covering for a fairing core of a low density material.

It is a general object of the present invention to provide a novel and improved blade for rotors of aircraft and novel methods of assembling the same.

More particularly it is an object of the invention to provide a blade of the type described which may be constructed and assembled from a minimum number of simple parts using standard aircraft construction practice and in which all rivets may be appropriately bucked and need not be applied blind.

A further important object of the invention consists in the construction of a rotor blade in which the leading edge and nose portion is formed to a D shape by combining a contoured airfoil skin of relatively heavy gauge with a U-shaped channel slightly nested therein, the bottom of which forms the straight portion of the D and in which the assembly of the two parts provides for the attachment of the forward edges of stressed skin sheets defining the trailing portion of the blade.

Another important object of the invention comprises the construction of a rotor blade by the use of a low density cellular plastic material as a core or fairing for the whole volume of the blade aft of the channel, which fairing is enclosed in the aforementioned skin sheets.

Still another important object of the invention consists in the attachment of the fairing core to the whole inner area of the skin sheets by means of a plastic adhesive forming the sole securing means between these parts.

A still further important object of the invention consists in the provision of a novel assembly procedure, which permits the bucking of all rivets and the bonding attachment of the skin sheets to the fairing core.

As an important feature of the invention may be noted the provision of a nose section comprising a self-supporting sheet contoured to the desired airfoil shape and attached at its rear edges to the flanges of a U-channel thereby providing a totally unobstructed conduit or duct for the full span of the leading edge of the blade capable of carrying heated air for anti-icing or de-icing processes.

Another important feature of the invention consists in the arrangement of the fairing core covering skin whereby maximum smoothness of surface is achieved and fastenings are eliminated to a large extent particularly over the critical areas of the blade.

Other important objects and features of the invention will be more apparent to those skilled in the art upon a consideration of the accompanying drawing and following specification wherein is disclosed a single exemplary embodiment of the invention with the understanding that such changes and modifications may be made therein as fall within the scope of the appended claims without departing from the spirit of the invention.

In said drawings:

Fig. 1 is a plan view of a rotor blade constructed in accordance with the present invention; and Fig. 2 is a transverse section taken on line 2—2 of Fig. 1 at right angles to the pitching axis of the blade and illustrating on an enlarged scale both the finished blade and the position of the skin before their assembly on the core fairing.

Blades for aircraft rotors, and particularly those of the type used for helicopter sustaining and propulsion, are subject to varied and heavy stresses under static conditions, under idling and when sustaining and propelling a load. These stresses vary considerably in their form, point of application and intensity, and blades must be constructed not only to resist all of these stresses, as well as the tremendous centrifugal force, but must be sufficiently light to reduce the centrifugal force to a minimum. Their construction should follow as much as practicable the standardized practice in aircraft work and yet every effort must be made to simplify the construction, reduce the number of parts and improve the technique of assembly. Blind riveting is resorted to reluctantly in such construction because of the inability to inspect and determine the quality of the attachment. By novel assembly methods such riveting is eliminated in the present blade and all rivets are inserted and bucked in accordance with standard practice.

Referring now to the drawing, it will be noted that the blade comprises an airfoil portion 10 and a root portion or fitting 12. The airfoil section may take any desired shape in plan. The transverse section, however, throughout at least the major portion of the span is preferably symmetrical and designed from the NACA 00 family, preferably 0012. The airfoil portion of the blade may be substantially uniform in section throughout its span or may taper in thickness from root to tip in accordance with the wishes of the designer. A rounded tip blade is illustrated but square tips can readily be achieved in accordance with the present invention. The blade is entirely covered with metal and is rendered watertight, moistureproof and given increased strength by coating all faying surfaces with an appropriate cement or bonding material, preferably of the type requiring heating to produce its final set. By using this bonding material on all seams and joints the stresses are uniformly distributed and the rivets are relieved to a great degree, although in designing the blade their number and size is determined to alone carry the full load.

The airfoil comprises two major portions, a nose portion and a fairing or trailing portion, and a unique method is used in assembling these. The nose portion is formed from a single relatively heavy gauge metal sheet 14, bent to a substantially U-shape and contoured in accordance with the selected airfoil section. This sheet forms the leading edge and nose portion of the airfoil and the after edges 15 thereof extend substantially in alignment with the pitching axis of the blade. The nose sheet is reinforced and the after edges thereof held apart the proper distance so that the whole nose portion is converted into a spar, by partial nesting between the edges a U-shaped channel member 16 formed of relatively heavy gauge light weight metal. It includes a bottom or straight section 17, which closes off the nose area and the side flanges 18, which are offset about midway of their length as at 19. The amount of this offset is exactly the equivalent of the thickness of the sheet 14 whereby when the parts are nested smooth outer contour is achieved.

The space 20 defined by the D-section between the channel and the nose sheet constitutes a duct or conduit which may be made use of for the passage of heated air or gas for de-icing the blade.

The outer surface of the after or trailing portion of the blade is composed of two thin metal skin sheets 22, shown in Fig. 2 in dotted lines in their initial assembly position and in solid lines as completing the blade. The forward edge of each sheet 22 is given the same offset as the corresponding flange of the U-channel so that it fits smoothly over the whole flange surface when interposed between the flange and the inner wall of the nose sheet 14, as clearly shown in Fig. 2. The four parts of the airfoil thus assembled are appropriately bonded on the faying surfaces with adhesive, and rivets 24 are inserted through each overlap and bucked on the interior in a conventional manner possible because of the spacing of the sheets 22. The surfaces of the sheets 22 are substantially contiguous with sheet 14 so that a minimum of airflow disturbance occurs at the junction. Obviously the small crack existing because of the bend of the sheet metal of the skin may be appropriately filled in with a surfacing putty.

For determining and maintaining the shape of the rear skins 22 a fairing core 26 is provided. Such a core is preferably composed of a plurality of plies of a low-density cellular material, such as a synthetic resin like cellulose acetate, which has dimensional stability, light weight, considerable strength and minimum hygroscopicity. As shown the intermediate ply 27 of the preferred three plies is substantially thicker than the outer plies 28 and over a considerable portion of its area is perforated by relatively large circular openings 30 to reduce the weight. The outer plies are bonded along the lines 31 to the center ply and cover up the perforations.

While molding could be resorted to for forming the core, greater dimensional accuracy is achieved by forming it from seasoned plies as just described and machining the outer surface to the exact desired contour both for fitting within the whole of the channel and for determining the surface against which the skins are bonded.

The after or trailing edge of the core is reinforced by a metal strip 32 of triangular cross-section as shown, which may be attached by bonding or otherwise to the core.

After assembling the nose sheet, the U channel and the skins and completely contouring the core, the whole outer surface of the latter and/or the interior of the channel and of the skins is coated with an appropriate bonding adhesive and the core is inserted to the positon shown in Fig. 2. Thereafter the skins are formed down to contact the core surface and, with the trailing edge reinforcing strip, are drilled to receive rivets 33 which can be headed in the customary manner to secure the trailing edges of the skins to the core. The whole assembly is then fitted in an accurately shaped two part mold which determines the outer configuration of the finished blade and thereafter is heated to effect the setting of all of the plastic bonding or cementing material. After cooling it is ready for use.

The root fitting 12 illustrated in Fig. 1 is a suitable forging or extrusion having a substantially cylindrical radial portion 34 and the thickened cylindrical end 35 whose axis is vertical. The latter is drilled as at 36 to receive the drag axis pin. Extending from the cylindrical portion 34 are a pair of integral spaced plates 37, one to engage each of the opposite faces of the blade. The blade where engaged by these plates is of maximum thickness and its inner end is shaped as by champfering as at 38 for a short distance on the nose section and at 39 for a longer distance adjacent the trailing edge. The inner end 40 is straight and at right angles to the blade axis. In order to provide a rigid base structure to which the root fitting is attached the inner end of the core comprises a block 41 of relatively rigid and solid plastic material which abuts the lighter weight core along line 42.

The plates 37 of the root fitting are attached to the skin and filler block as well as to the U-channel and nose sheet 14 of the blade by means of a plurality of through bolts 44. In order to distribute the stresses on the several skin sheets appropriate doubler plates 45 and 46 are applied to both faces of the blade, as shown in Fig. 1, and riveted to each other, to the skins and to the nose and channel elements, as clearly seen. These doubler skins are appropriately shaped and positioned to distribute the stresses as uniformly as possible from the root fitting to the whole blade. As with all other faying surfaces they are attached by bonding cement to the skin, nose sheets, to each other and to the root fitting side plates whereby the stresses are as uniformly distributed as possible and taken to a large extent from the mechanical fastenings. The champfered corners 38 and 39 of the skins are well closed off by the bonded filler block to exclude moisture.

Since the filling material forming the core is slightly hygroscopic, even though to a lesser degree than Balsa wood, it is carefully sealed within the skin of the blade to insure against any possible change in weight which might upset the balance in the event of moisture absorption. From the standpoint of blade balance changes may be made as desired by variations in the relative thicknesses of the parts of the blade, by the use of various weights of sheet metal for the nose section, and in extreme cases by the use of weight elements suitably sized and positioned by riveting in the leading edge of the blade.

The skin sheets 22 may be designed of sufficient thinness to provide only for the protection and sealing of the core, or they may be given some additional weight to act as stressed skins and augment the strength of the core whose best resistance is to shear and to dimensional changes. The principal beam strength of the blade comes from the effective spar caused by the junction of the nose sheet and U-channel. The adequate bonding of the thin skins to the core portion can be quite effective and provides added resistance to stresses as well as the prevention of ballooning resulting from negative stress areas on the upper surface of the skin. These stresses seldom exceed 2 to 3 p. s. i. and the bond can easily resist such force.

The metal parts of the blade are preferably of the same metal to eliminate electrolysis and are selected by preference from among the suitable aluminum alloys because of their light weight, high strength, resistance to corrosion, stiffness and resistance to notch sensitivity and fatigue failure.

I claim:

1. A sustaining rotor blade comprising, in combination, an airfoil including a rigid spar portion and a trailing portion; said spar portion being D-shaped in cross-section, fully open through its transverse area from end to end and including a rigid metal nose sheet contoured to airfoil form and a rigid metal U-channel closing the rear edges thereof and itself open to the rear, the flanges of said channel being outwardly offset intermediate their width an amount equal to the thickness of the nose sheet; said trailing portion including a cellular plastic laminate having a center ply formed with a plurality of through lightening holes covered by imperforate outer plies, said laminate being contoured to complete the airfoil form of said nose with its forward edge shaped to closely fit in said open rear of said channel, and metal covering sheets of insufficient rigidity to be self-supporting secured to the entire faces of the laminate, each such sheet having its forward edge inserted between the nose sheet and a forward portion of a flange of the channel; and bucked rivets securing each overlapped nose sheet edge, channel flange and covering sheet edge together.

2. A rotor blade comprising in combination, an airfoil including a rigid hollow spar portion forming the nose section of the blade and a lightweight trailing portion, said latter portion including a core of cellular plastic of desired airfoil shape and a sheet of metal having its forward edge secured to said spar and being adherent to all of the area of each face of the core, said sheets being of insufficient rigidity to be self-supporting under load, said core being composed of seasoned laminae of said plastic adhesively secured together, the outer laminae being imperforate to provide maximum surface for adhesion to said sheets and the remainder being provided with a plurality of relatively large through perforations to reduce the weight, said core being machined to airfol shape after assembly of the laminae.

DONALD N. MEYERS.

REFERENCES CITED

The following references are of record in the file of this patent:

UNITED STATES PATENTS

| Number | Name | Date |
|---|---|---|
| 1,452,961 | Dornier | Apr. 24, 1923 |
| 1,501,606 | Leitner | July 15, 1924 |
| 1,785,543 | Dornier | Dec. 16, 1930 |
| 1,790,213 | Gwaltney | Jan. 27, 1931 |
| 1,842,178 | Kempton | Jan. 19, 1932 |
| 1,843,886 | Semmes | Feb. 2, 1932 |
| 1,976,480 | Carleton | Oct. 9, 1934 |
| 2,008,234 | Weeks | July 16, 1935 |
| 2,183,158 | Bennett | Dec. 12, 1939 |
| 2,341,997 | Law | Feb. 15, 1944 |
| 2,377,846 | Dreyfus et al. | June 5, 1945 |
| 2,426,123 | Sikorsky | Aug. 19, 1947 |
| 2,426,130 | Wald | Aug. 19, 1947 |
| 2,460,351 | Hoffman | Feb. 1, 1949 |

FOREIGN PATENTS

| Number | Country | Date |
|---|---|---|
| 417,139 | Great Britain | Sept. 28, 1934 |
| 504,849 | Great Britain | May 2, 1939 |